United States Patent [19]

Lebrun et al.

[11] Patent Number: 5,057,132

[45] Date of Patent: Oct. 15, 1991

[54] DEVICE FOR PRODUCING COLD AND/OR HEAT BY A SOLID-GAS REACTION

[75] Inventors: Michel Lebrun, Perpignan; Michel Mayslich, Sevres; Bernard Spinner, Corveilla del Vercol, all of France

[73] Assignee: Societe Nationale Elf Aquitaine, Courbevoie, France

[21] Appl. No.: 461,940

[22] Filed: Jan. 8, 1990

[30] Foreign Application Priority Data

Jan. 11, 1989 [FR] France .................. 89 00268

[51] Int. Cl.⁵ .................................................. F25D 5/00
[52] U.S. Cl. ........................................... 62/4; 62/480; 62/481; 62/112; 165/104.12
[58] Field of Search ............ 62/112, 480, 4, 481; 165/104.12

[56] References Cited

U.S. PATENT DOCUMENTS

| | | | |
|---|---|---|---|
| 2,068,891 | 1/1937 | Scholl | 62/481 |
| 3,191,392 | 6/1965 | Donnelly | 62/4 |
| 4,138,861 | 2/1979 | Wurm | 62/480 |
| 4,784,217 | 11/1988 | Payre et al. | 165/104.12 |

OTHER PUBLICATIONS

Commission of the European Communities, Energy report, Feb. 1979, pp. 31, 30, 180 and 181.

*Primary Examiner*—Albert J. Makay
*Assistant Examiner*—John Sollecito
*Attorney, Agent, or Firm*—Oblon, Spivak, McClelland, Maier & Neustadt

[57] ABSTRACT

Device for producing cold and/or heat by a solid gas reaction comprising a first and a second reactor each of which contains a salt capable of reacting by absorption with a gas by an exothermic reaction, the first reactor being in communication in a first operating stage with an enclosure intended to retain the gas, the second reactor being in communication, in the first operating stage, with an enclosure intended to release the gas, according to the invention, each reactor comprises a different salt. A device comprising four reactors provided with three different salts is also described.

9 Claims, 4 Drawing Sheets

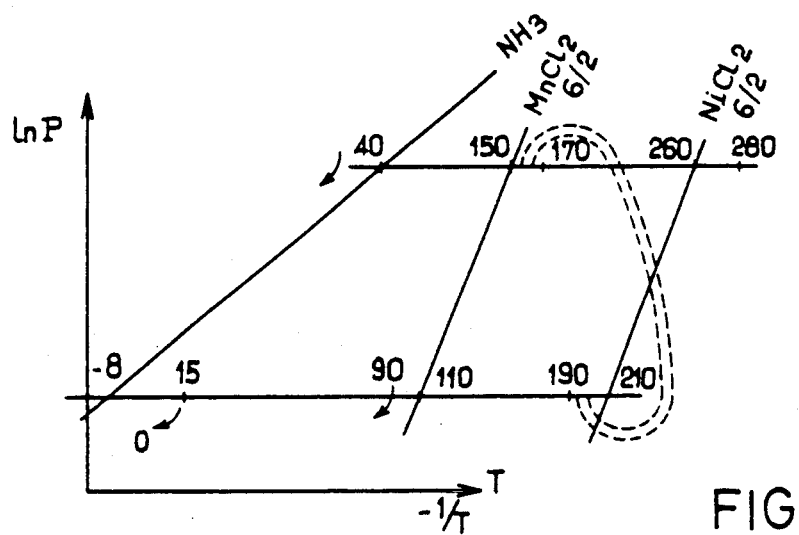
FIG_7
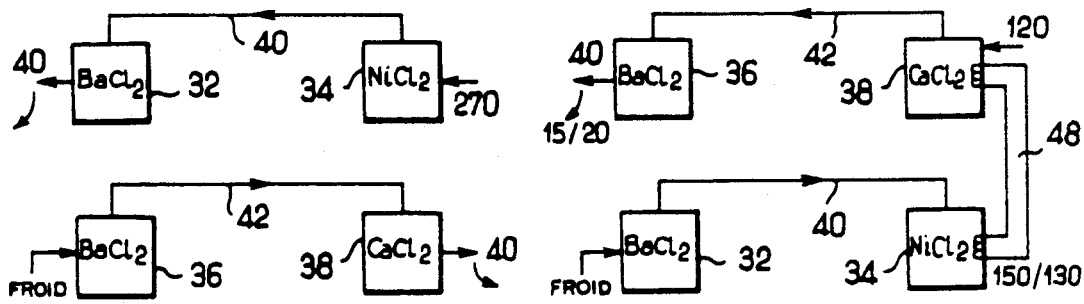
FIG_8A  FIG_8B
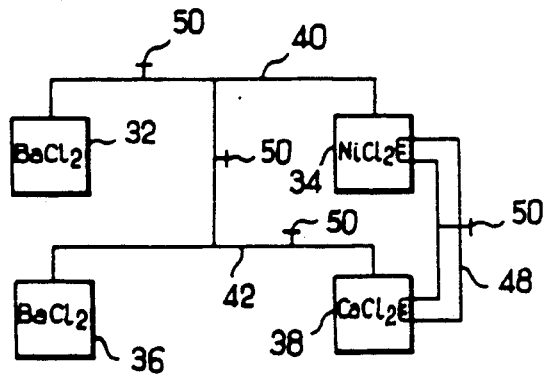
FIG_9

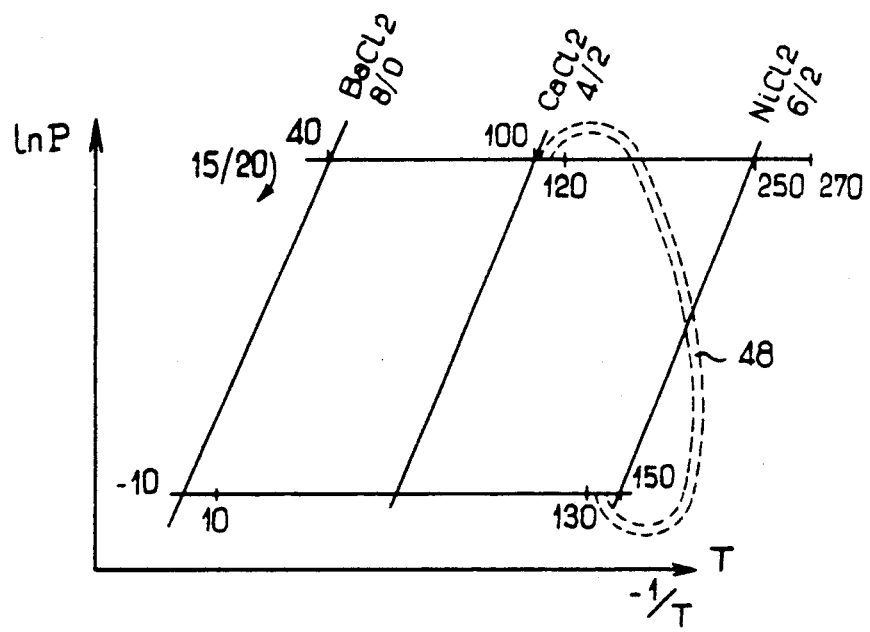
FIG_10
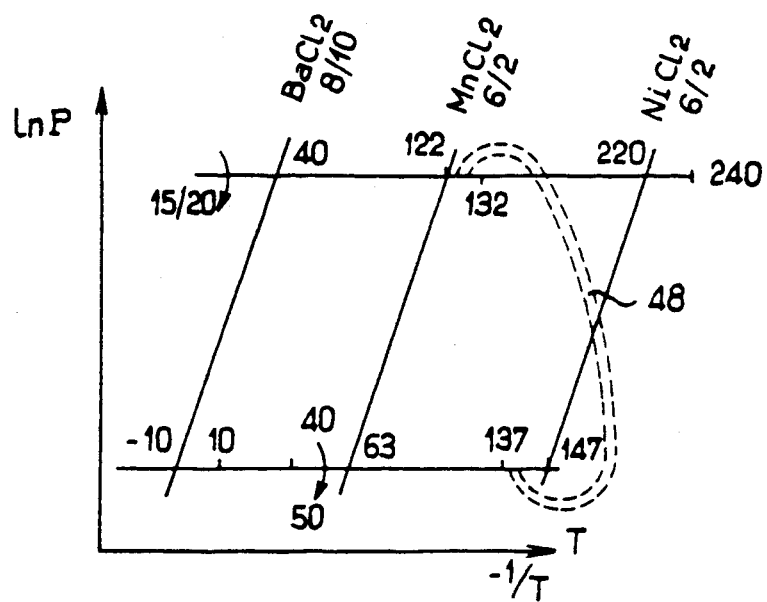
FIG_11

DEVICE FOR PRODUCING COLD AND/OR HEAT BY A SOLID-GAS REACTION

The present invention relates to a device for producing cold and/or heat by a solid-gas reaction.

The device provided by the invention is based on the use of the so-called "thermochemical pump" system, whose main characteristics are the following:
heat energy is employed for the operation of the system itself; electrical energy is optionally employed only for circulating the heat-transfer fluids,
a reversible reaction between a solid and a gas, of the type:

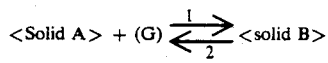

is employed as a "chemical engine".

The reaction is exothermic in direction 1, which means that in this direction it produces heat, and endothermic in direction 2, that is to say that in this direction it produces cold.

A system of this kind makes it possible to store energy in chemical form and has various fields of application.

Moreover, a system of this kind makes it possible to produce, from a source of heat at a temperature Ts, heat at a temperature Tu such that:

Tu <Ts

In this case, the system is called a "chemical heat pump".

A system of this kind also makes it possible to produce, from a source of heat at a temperature T's, heat at a temperature T'u such that:

T'u >T's

In this case, the system is called a "chemical thermoconverter".

By virtue of this system it is possible to produce refrigeration energy from a source of heat and simultaneously to produce, from a source of heat at a temperature T"s, heat at a temperature T"u (T"u <T"s) and refrigeration energy.

According to the cases, the use of the heat or of the cold produced is simultaneous with the consumption of energy at high temperature (Ts, T's, T"s) or delayed in time (storage effect).

French Patent Application No. 87/07,210 discloses a device for producing cold and/or heat continuously, which comprises two reactors containing the same solid compound, a condenser and an evaporator.

Despite its advantages, this device is limited in efficiency.

The objective of the present invention is therefore to provide a device for producing cold and/or heat, which is improved in efficiency.

According to a first form, the invention provides a device for producing cold and/or heat by a solid-gas reaction, comprising a first and a second reactor each of which contains a salt capable of reacting by absorption with a gas by an exothermic reaction, the first reactor being in communication in a first operating stage with an enclosure intended to retain the gas, the second reactor being in communication, in the first operating stage, with an enclosure intended to release the gas, characterized in that each reactor contains a different salt.

The advantages and the operation of the present invention will appear more clearly on reading the following description, given without any limitation being implied, with reference to the attached drawings, in which:

FIG. 1 is a Clapeyron diagram for a device according to a first embodiment of the invention;

each of FIGS. 2A and 2B is a diagrammatic view of a plant according to the first embodiment;

FIG. 3 is a diagrammatic view of a complete plant corresponding to FIGS. 2A and 2B;

each of FIGS. 4 to 7 is a Clapeyron diagram for other embodiments of the invention;

each of FIGS. 8A and 8B is a diagrammatic view of a plant according to the invention, comprising four reactors;

FIG. 9 is a diagrammatic view of a complete plant corresponding to FIGS. 8A and 8B;

FIG. 10 is a Clapeyron diagram for the device of FIGS. 8A, 8B and 9; and

FIG. 11 is a Clapeyron diagram for another embodiment, comprising four reactors.

The operation of the devices according to the invention is based on the reaction between a salt and a gas. Since a true chemical reaction is involved, there is a monovariant system at equilibrium, that is to say that a single-value relationship exists between the temperature and the pressure, of the form $\log P = A - B/T$, an expression in which P is the pressure, T the temperature in K and A and B are constants characteristic of the salt/gas pair employed.

Figure 1:
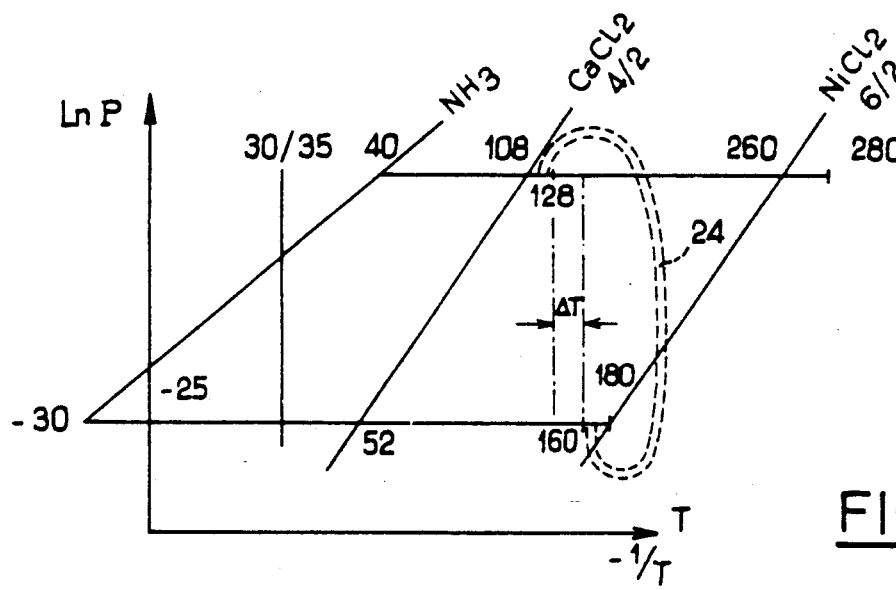

In the following description, the operating stages will be represented in a Clapeyron diagram such as shown in FIG. 1, which comprises equilibrium straight lines for the salts employed.

Figures 2A, 2B:
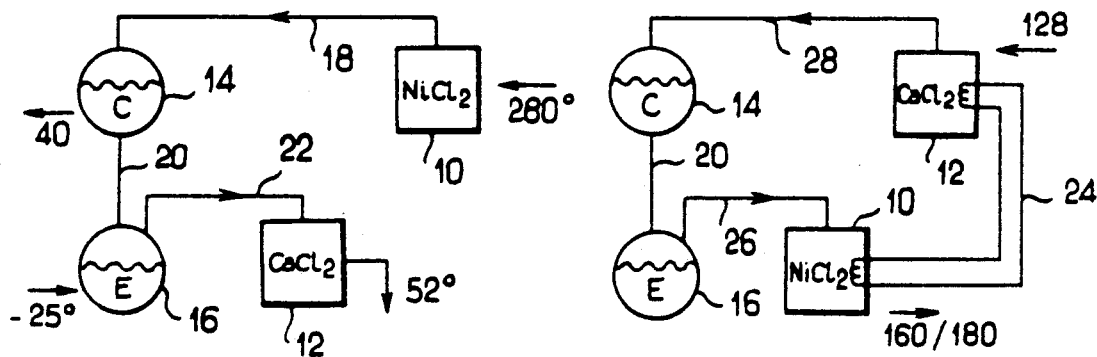

FIG. 2A shows a device for producing cold by a solid-gas reaction according to a first embodiment of the invention. The device comprises a first and a second chemical reactor 10, 12, a condenser 14 and an evaporator 16. Each chemical reactor 10, 12 is made up of an enclosure, for example of metal, in which a quantity of salt is provided.

In the example illustrated, the reactor 10 contains $NiCl_2$, which is originally in the form of a complex with ammonia, and the reactor 12 $CaCl_2$. The condenser 14 and the evaporator 16 are of traditional construction and are arranged so as to be able to exchange heat with their environment.

As shown in FIG. 2A, the first operating stage consists in heating the first chemical reactor 10 up to a temperature of 280° C., for example by circulating superheated steam through a heat exchanger (not shown) arranged inside this reactor. The salt, originally rich in ammonia releases this ammonia, which flows through a conduit 18 towards the condenser 14. Condensation of the ammonia releases heat at a temperature of 40° C., which is recovered by water introduced into the condenser at ambient temperature, which is 30 to 35° C. in the example illustrated. Ammonia in the liquid state then flows through a conduit 20 into the evaporator 16, where it evaporates, absorbing heat and thus creating cold at a temperature of −25° C. The ammonia vapour finally flows through a conduit 22 towards the second reactor 12, where it is absorbed by the salt $CaCl_2$ at a temperature below 52° C.

According to a form of the invention, as shown diagrammatically in FIG. 2B, the two reactors 10, 12 are connected by a heat-transfer device 24. This device may comprise a heat exchanger or a heat-transfer system in which a heat-transfer fluid circulates. However, the heat-transfer device 24 may comprise a heat pipe 24, for example that described in French Patent Application No. 88/04,165.

In a second operating stage, as shown in FIG. 2B, the reactor 10 is connected to the evaporator 16 by a conduit 26 and the reactor 12 is connected to the condenser 14 by a conduit 28. At the same time, the heat-transfer system 24 between the two reactors 10, 12 is set in operation. The salt in the reactor 10, which is poor in ammonia, absorbs ammonia and heats up to a temperature below 108° C. The heat of absorption of the NiCl₂ is transferred by the heat-transfer system 24 to the CaCl₂ in the reactor 12 and serves as a source of heat of desorption of the CaCl₂, which becomes rich in ammonia at the end of the first stage.

The salt in the reactor 12 desorbs ammonia, which flows first to the condenser 14 and then to the evaporator 16, as in the first stage. According to the invention, the choice of the salts employed in the reactors 10 and 12, and the use of the device for transferring heat 24 between the reactors make it possible to create cold at a temperature of −25° C., continuously in the example which is given. It follows that, at the end of the second stage, the reactors 10 and 12 will be reconnected according to the circuit of FIG. 2A.

Figure 3:
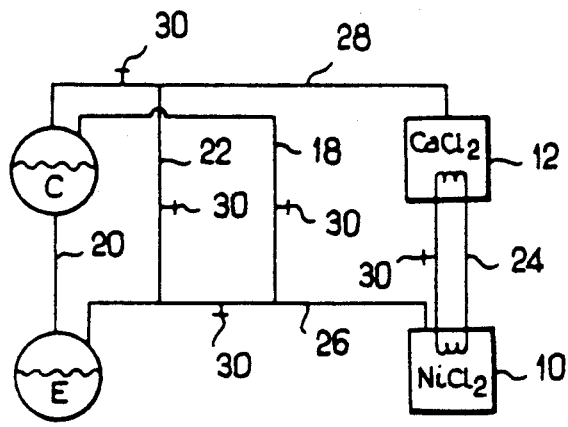
Figure 4:
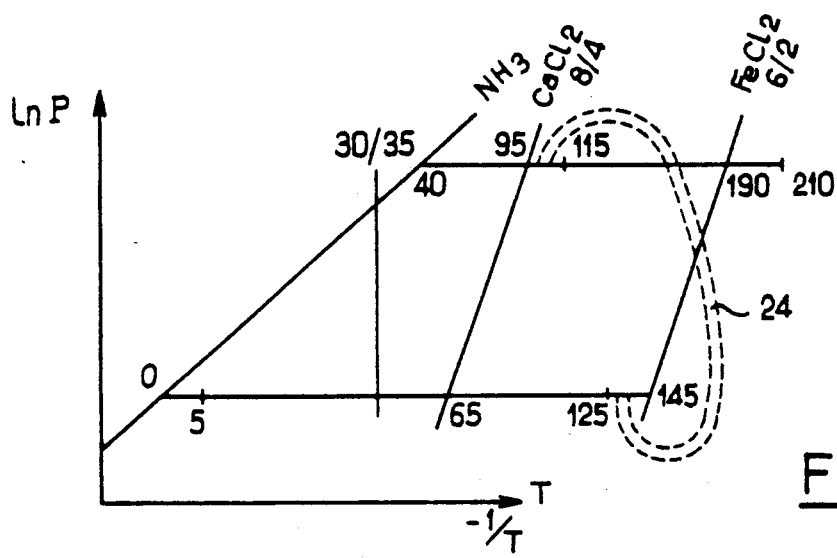
Figure 5:
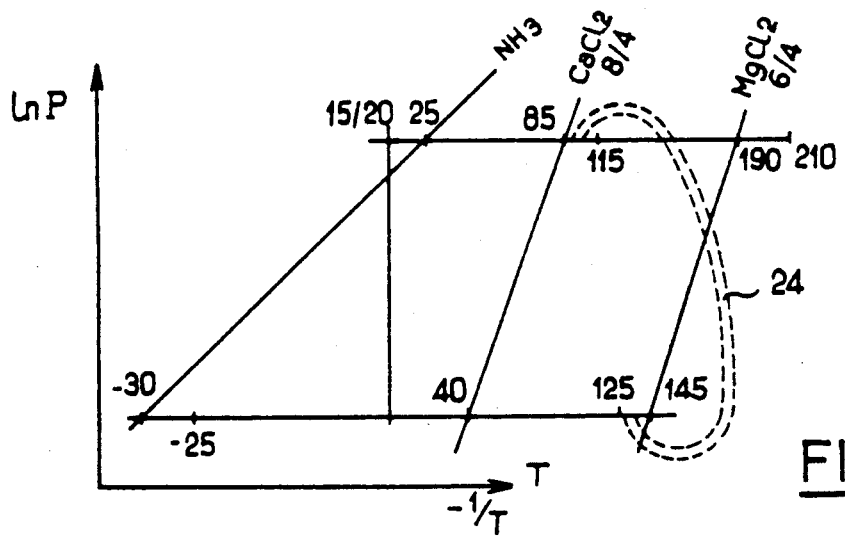
Figure 6:
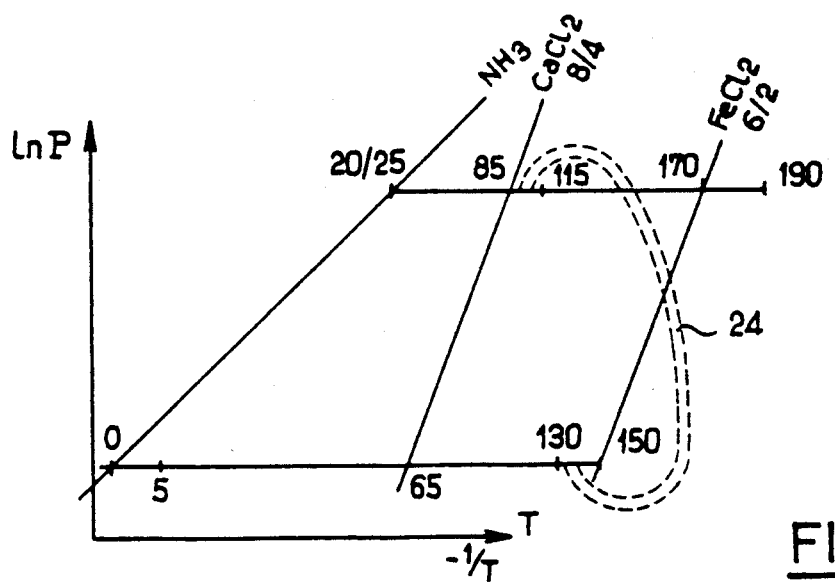

A complete circuit enabling the device to operate continuously is shown in FIG. 3. Each of the conduits 18, 22, 26 and 28 and the heat pipe 24 is provided with a corresponding valve 30 permitting the transition from the first to the second stage and vice versa.

According to another form of the invention, the salts employed are such that a difference exists between the temperature of absorption of the salt in the reactor 10 and the temperature of desorption of the salt in the reactor 12. As shown in FIG. 1, there is a difference $\Delta T$ between the absorption temperature of NiCl₂ which lies between 160° C. and 180° C., and the desorption temperature of CaCl₂, which lies between 108° C. and 128° C. The difference $\Delta T$ has therefore a minimum value of 32° C., a value which ensures an efficient heat transfer through the heat transfer system 24. As is known, for a heat exchanger to be capable of transferring heat efficiently between two points, there must be a temperature difference of at least 5° C between these points.

The performance of a device for producing cold and/or heat by a solid-gas reaction can be evaluated by employing the economic concept of the coefficient of performance or COP.

In the case of a device intended to produce cold like that shown in FIG. 3, the COP is defined by the relationship:

$$COP = \frac{H_e + H_e}{H_R + \rho C_p \Delta T}$$

an expression in which $\Delta H$ is the heat of liberation of the gas, $\Delta H_R$ is the heat of reaction of desorption of the gas from the salt and $\rho C_p \Delta T$ is the sensible heat to be supplied to the reactor and to the salt between the two temperature levels corresponding to the absorption reaction and the desorption reaction.

FIGS. 4 to 7 show Clapeyron diagrams for devices employing two different salts and intended to produce either cold or heat at a given temperature. In each case, the plant employed and its operation correspond to those of the device of FIG. 3; only the operating temperatures and the salts are changed.

EXAMPLE 2

FIG. 4

The plant in this example is intended to produce cool air at 5° C for air-conditioning a building. The reactor 10 contains FeCl₂ and the reactor 12 contains CaCl₂. The plant requires a source of heat at 210° C. and releases heat into the surrounding air, which has a temperature of 30–35° C. The heat of absorption of FeCl₂ in the reactor 10 at a temperature of 125 to 145° C. flows through the heat-transfer device 24 and is employed as heat of desorption of the CaCl₂ in the reactor 12 at a temperature of 95 to 115° C.

For this plant, the COP is $$COP = \frac{0.5 + 0.5}{1 + 0.05} \approx 0.95$$

EXAMPLE 3

FIG. 5

The plant in this example is intended to produce cold at −25° for refrigeration. The reactor 10 contains MgCl₂ and the reactor 12 contains CaCl₂. The plant requires a source of heat at 210° C. and releases heat into the surrounding air or water which has a temperature of 15 to 20° C.

For this plant, the COP is $$COP = \frac{0.5 + 0.5}{1 + 0.05} \approx 0.95$$

EXAMPLE 2

FIG. 6

As for Example 2, this plant is intended to produce cool air at 5° C. for air-conditioning a building. The reactor 10 contains FeCl₂ and the reactor 12 contains CaCl₂. The plant employs a source of heat at 190° C. and releases heat into the surrounding air or water which has a temperature of 15 to 20° C.

For this plant, the COP is $$COP = \frac{0.5 + 0.5}{1 + 0.05} \approx 0.95$$

EXAMPLE 5

FIG. 7

This plant is also intended to produce cool air, but at a temperature of 0° C. In addition, the plant produces heat at a temperature of 90° C. and can therefore be used for air conditioning and heating. The plant requires a source of heat at 280° C. and releases heat into the water circulating in the condenser at a temperature of 15 to 20° C. The reactor 10 contains NiCl₂ and the reactor 12 contains MnCl₂.

Two coefficients of performance can be calculated for this plant:

$$\text{Cold } COP = \frac{0.5 + 0.5}{1 + 0.05} \approx 0.95$$

-continued $$\text{Heat } COP = \frac{1}{1 + 0.05} \approx 0.95$$

It should be noted that, in this example, the heat at 90° C. is produced only during one half of the complete cycle time. In contrast, the cold at 0° C. is produced continuously.

FIGS. 8 and 9 show a plant according to another embodiment of the invention, comprising four reactors which contain three different salts.

The device shown in FIG. 8A is intended to produce cool air at 5° C. by a solid-gas reaction and comprises four reactors 32, 34, 36 and 38 similar in construction to those of FIG. 2, but does not employ any condenser or evaporator. In the example illustrated, the reactors 32 and 36 contain $BaCl_2$, the reactor 34 contains $NiCl_2$ and the reactor 38 $CaCl_2$. The salts in the reactors 34 and 36 are initially in the form of a complex with ammonia.

In a first operating stage, the reactor 34 is heated to a temperature of 270° C. The salt, originally rich in ammonia, releases this ammonia, which flows through a conduit 40 towards the reactor 32, where it is absorbed by the $BaCl_2$ releasing heat at a temperature of 40° C., which is recovered by the surrounding air. Also in the first stage, the ammonia contained in the reactor 36 is desorbed and flows through a conduit 42 towards the reactor 38 where it is absorbed by the $CaCl_2$. The desorption of ammonia creates cold in the reactor 36 at −10° C. and the absorption of ammonia by the $CaCl_2$ releases heat at 40° C., which is removed by the surrounding air.

In a second operating stage shown in FIG. 8B, the reactor 38 is connected to the reactor 36 by the conduit 42, and the reactor 32 is connected to the reactor 34 by the conduit 40. At the same time, the heat-transfer system 48 between the reactors 34 and 38 is set in operation. The salt in the reactor 34, which is poor in ammonia, absorbs ammonia originating from the reactor 32 and heats up to a temperature of approximately 150° C. The heat of absorption of $NiCl_2$ is transferred by the heat-transfer system 48 to the $CaCl_2$ in the reactor 38 and serves as a source of heat of desorption of the $CaCl_2$, which, at the end of the first stage, is rich in ammonia. The salt in the reactor 38 desorbs ammonia, which flows through the conduit 44 to the reactor 36, where it is absorbed by the $BaCl_2$, releasing heat at 40° C. towards the surrounding air. The desorption of ammonia by the $BaCl_2$ in the reactor 32 creates cold at −10° C.

FIG. 9 shows a complete circuit enabling the device to operate continuously. Each of the conduits 40 and 42 and the heat-transfer system 48 are provided with a corresponding valve 50 permitting the transition from the first to the second stage and vice versa.

In the example shown in FIG. 10, Example 6, the $$COP = \frac{1 + 1}{1 + 0.1} \approx 1.9$$

EXAMPLE 7
FIG. 11

FIG. 11 shows a second example of a plant employing four reactors provided with three different salts. The plant and its operation correspond to those of the device in FIG. 9. In this example, the plant is intended to produce cool air at 10° C. for air conditioning and heat at 50° C. The reactors 32 and 36 contain $BaCl_2$, the reactor 34 contains $NiCl_2$ and the reactor 38 $MnCl_2$.

The plant employs heat at 240° C. and releases heat into the surrounding air at 40° C. As in the preceding example, the heat of absorption of the $NiCl_2$ flows through the heat-transfer system and is employed as heat of desorption of the $MnCl_2$ in the reactor 38.

Two coefficients of performance can be calculated for this plant:

$$\text{Cold } COP = \frac{2}{1 + 0.1} \approx 1.9$$

$$\text{Heat } COP = \frac{1}{1 + 0.1} \approx 0.9$$

It should be noted that, as in Example 5, the heat produced at 50° C. can only be recovered during one half of the cycle, whereas the cold is produced continuously. In this example, the T across the heat-transfer system 48 is of the order of 15° C., which is relatively low. However, the use of a device of this kind is advantageous if the plant comprises a heat-storage device.

The use of salts chosen from the following list can also be envisaged for making use of the device according to the invention:

| | |
|---|---|
| $ZnSO_4$ | $ZnCl_2$ |
| $CaCl_2$ | NaCl |
| $SrCl_2$ | NaBr |

Thus, in the case of a given plant, the invention makes it possible to have an improved efficiency.

We claim:

1. Device for producing cold and/or heat by a solid-gas chemical reaction comprising a first (10;34) and a second (12;38) reactor each of which contains a salt capable of chemical reaction with a gas by an exothermic reaction, the first reactor (10;34) being in communication in a first operating stage with an enclosure (14;32) intended to retain the gas, the second reactor being in communication, in the first operating stage, with an enclosure (16;36) intended to release the gas, characterized in that each reactor contains a different salt; and further comprising a heat-transfer device (24) capable of transferring heat between the first and second reactor (10, 12) during the second operating stage.

2. Device according to claim 1, characterized in that, enclosure (14) intended to retain the gas comprises a condenser (14) and the enclosure (16) intended to release the gas comprises an evaporator (16), the condenser and the evaporator being placed in communication.

3. Device according to claim 2, characterized in that, in a second operating stage, the first reactor (10) is placed in communication with the evaporator (16) and the second reactor (12) is placed in communication with the condenser (14).

4. Device according to claim 1, 2 or 3, characterized in that the first reactor (10) contains $NiCl_2$ and the second reactor (12) contains $MnCl_2$, the gas being ammonia.

5. Device according to claim 1, 2 or 3, characterized in that the first reactor contains $FeCl_2$, $MgCl_2$ or $NiCl_2$, the second reactor containing $CaCl_2$, and the gas being ammonia.

6. Device according to claim 1, characterized in that the enclosure (32) intended to retain the gas and the enclosure (36) intended to release the gas comprise a third (32) and a fourth (34) reactor respectively, each containing a salt of reacting with the gas.

7. Device according to claim 6, characterized in that that third (32) and the fourth (34) reactors contain the same salt.

8. Device according to claim 7, characterized in that the third (32) and the fourth (34) reactors contain $BaCl_2$.

9. Device according to one of claims 6 to 8, characterized in that it comprises a heat-transfer device (48) capable of transferring heat between the first and the second reactor.

* * * * *